W. H. Chamberlin
Potato - Digger

No. 74,991      Patented March 3, 1868

Witnesses:
W. C. Ashkettle
J. A. Fraser

Inventor:
W. H. Chamberlin
per
Munn & Co.
Attorneys

United States Patent Office.

WILLIAM H. CHAMBERLIN, OF MEDINA, NEW YORK.

Letters Patent No. 74,991, dated March 3, 1868.

IMPROVEMENT IN POTATO-DIGGERS.

*The Schedule referred to in these Letters Patent and making part of the same.*

TO ALL WHOM IT MAY CONCERN:

Be it known that I, WILLIAM H. CHAMBERLIN, of Medina, in the county of Orleans, and State of New York, have invented a new and improved Potato-Digger; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish an improved potato-digger, simple in construction, easily adjusted, and effective in operation; and it consists in the construction and combination of the various parts, as hereafter more fully described.

Figure 1:
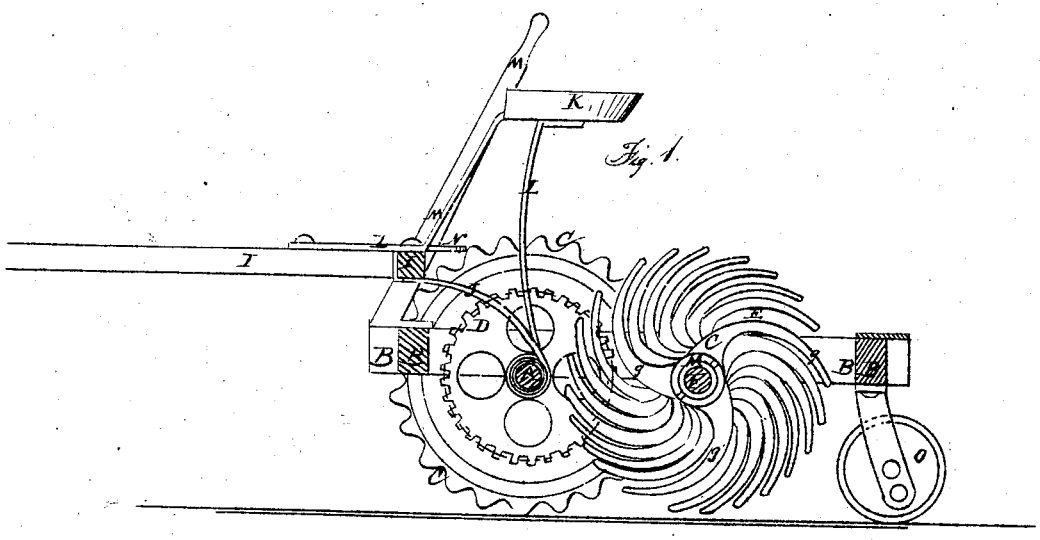
Figure 1 is a vertical section of my improved potato-digger, taken through the line $x$ $x$, fig. 2.
Figure 2:
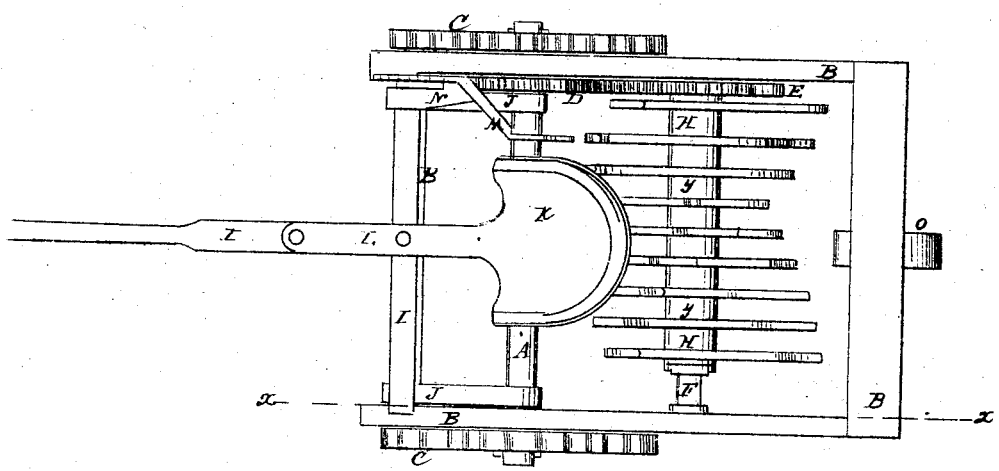
Figure 2 is a top or plan view of the same.
Figure 3:
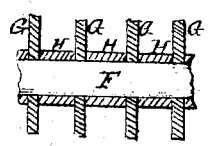
Figure 3 is a detail sectional view of the same, taken through the line $y$ $y$, fig. 2.

A is the axle of the machine, which revolves in bearings in the frame B, and to which one or both the drive-wheels C are rigidly attached, so that the said axle may be revolved by the advance of the machine. The faces of the wheels C are corrugated to enable them to take a surer hold upon the ground, and to prevent them from slipping. To the axle A, near one or both its ends, is attached a gear-wheel, D, the teeth of which mesh into the teeth of the gear-wheel E, attached to the shaft F, so that the said shaft may be revolved by the revolution of the axle A. Upon the shaft F is placed a series of wheels, G, made with three projecting curved prongs or arms $g'$, said arms or prongs being made at such a curve that they may enter and pass through the ground endwise. The pronged wheels G are placed at such a distance apart that the potatoes cannot pass between them, while the dirt that may be raised with the potatoes falls back upon the ground. The pronged wheels G are kept at their positions upon the shaft F by washers or collars H placed upon said wheels G. The wheels G are secured upon the shaft F spirally, or each succeeding wheel a little in advance of the preceding one, so that some of the prongs $g'$ may be in the ground at all times, giving steadiness to the motion of said machine, and so that the potatoes may roll down the inclined channels formed by the curves of the prongs $g'$, and be deposited in a row at one side of the machine. I is the tongue, the cross-bar of which is secured to the axle A by the shaft-irons J, so that the position of the frame B may be changed without changing the position of the line of draught. K is the driver's seat, which rests upon supports L, part of which are attached to the tongue I, and part ride upon the axle A, so that the position of the driver's seat may not be changed by changing the position of the frame B. M is a lever rigidly attached to the frame B, and extending up in such a position that its upper end may be easily reached and operated by the driver from his seat. By means of the lever M the rear end of the frame B, and with it the shaft F and pronged wheels G, may be raised from the ground for convenience in passing over obstructions, turning, or passing from place to place. N is a catch attached to the cross-bar of the tongue in such a position that when the rear part of the frame B is raised by the lever M, the said catch N may take hold of the said lever M and hold the said frame suspended until released by releasing the said lever from the said catch. The rear end of the frame B, when the machine is in working position, is supported upon the caster-wheel O, as shown in figs. 1 and 2.

I claim as new, and desire to secure by Letters Patent—

1. The wheels G, formed with three curved prongs $g'$, and removably arranged upon the shaft F, substantially in the manner herein shown and described, and for the purposes set forth.

2. The combination of the pronged wheels G, shaft F, frame B, gear-wheels E and D, axle A, drive-wheels C, and tongue I, with each other, substantially as herein shown and described, and for the purpose set forth.

3. The combination of the tongue I, seat K, bars L J, lever M, and catch N, with the frame B and axle A, all constructed, arranged, and operating substantially as herein set forth for the purpose specified.

WM. H. CHAMBERLIN.

Witnesses:
S. TUCKER,
J. CLYDE.